J. J. HENNESSY.
HUB LUBRICATING DEVICE.
APPLICATION FILED NOV. 6, 1919.
1,378,453.
Patented May 17, 1921.
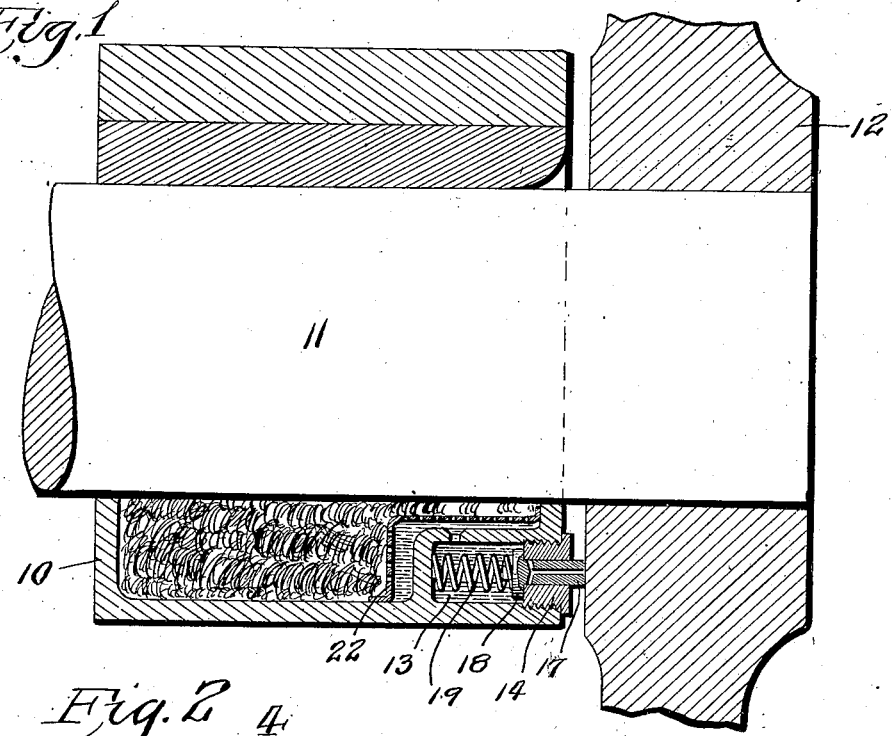
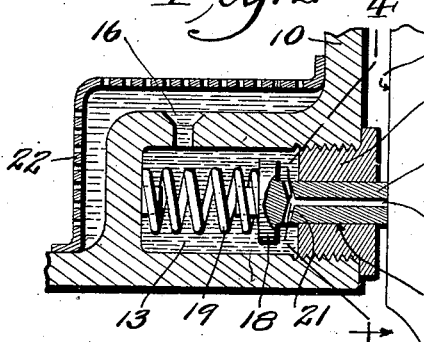
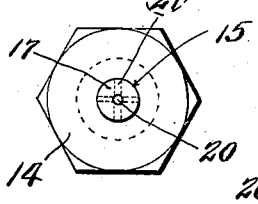
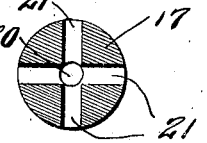
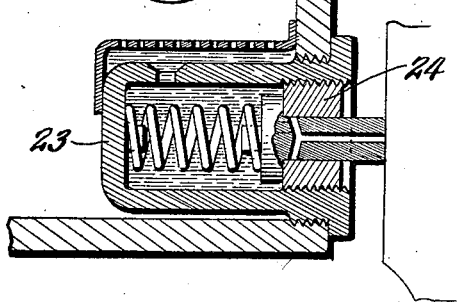
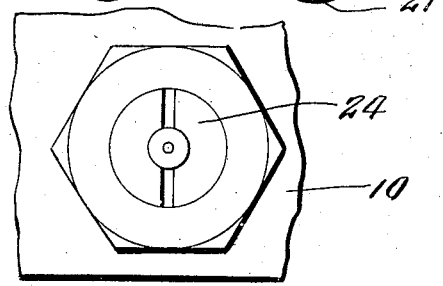
Inventor
James J. Hennessy

UNITED STATES PATENT OFFICE.

JAMES J. HENNESSY, OF NEW YORK, N. Y.

HUB-LUBRICATING DEVICE.

1,378,453.     Specification of Letters Patent.     Patented May 17, 1921.

Application filed November 6, 1919. Serial No. 336,019.

*To all whom it may concern:*

Be it known that I, JAMES J. HENNESSY, a citizen of the United States, residing at New York city, New York, have invented a certain new and useful Improvement in Hub-Lubricating Devices, of which the following is a full, clear, and exact description, such as will enable others skilled in the art to which it appertains to make and use the same, reference being had to the accompanying drawings, forming part of this specification.

My invention relates generally to lubricating devices and more particularly to a device adapted to be utilized in connection with journal boxes for automatically effecting the lubrication of the inner faces of locomotive wheel hubs, the hubs of inside bearing trailers of locomotives, and the like.

It will be understood that the wheel carrying axles of locomotives and the like have a slight lateral movement in their bearings, and as a result the inner faces of the wheel hubs very frequently contact with the outer portions of the bearings or parts of the wall in which said bearings are located, and as a result of such contact friction and rapid wear is produced, and I propose to overcome these objectionable results by arranging relatively simple devices in the journal box, preferably in the lower part thereof, and which devices are actuated by the lateral movement of the wheels for automatically applying liquid lubrication to the inner faces of the wheel hubs.

The principal object of my invention is to provide an automatic lubricating device which can be readily combined with the ordinary journal box and said device being very effective in performing its intended functions.

With the foregoing and other objects in view, my invention consists in certain novel features of construction and arrangement of parts, hereinafter more fully described and claimed, and illustrated in the accompanying drawings, in which—

Figure 1 is a sectional view of a journal box for a locomotive axle and showing my improved hub face lubricating device applied thereto.

Fig. 2 is an enlarged vertical section taken through the center of the lubricating device.

Fig. 3 is an elevational view of a bearing for the spring-pressed plunger of the device.

Fig. 4 is an enlarged cross section taken approximately on the line 4—4 of Fig. 2.

Fig. 5 is a vertical section of a modified form of the device.

Fig. 6 is an elevational view of the modified form of the device.

Referring by numerals to the accompanying drawings which illustrate a practical embodiment of my invention, 10 designates the locomotive journal box, 11 the journal of the axle, and 12 the hub of the wheel that is carried by said axle.

Formed in the lower outer corner of the journal box is a pocket 13, the outer end of which is closed by a screw plug 14, the same being provided with an axially disposed aperture 15 and formed in the upper portion of the wall which surrounds said pocket 13 is an aperture 16 which permits liquid lubricant to pass from the chamber within the journal box into the pocket 13.

Arranged for sliding movement through aperture 15 is a cylindrical plunger 17, the inner end of which or that end that is positioned within the pocket 13 being provided with a head or flange 18 and interposed between this head or flange and the end wall of the pocket 13 is a compression spring 19. Extending axially through the plunger 17 is a duct or passageway 20 and extending radially from the inner end thereof to points on the periphery of the plunger adjacent to the head or flange 18 are ports 21.

Surrounding the wall which incloses pocket 13 is a cage 22 of perforated sheet metal or wire netting and which cage prevents the waste or like fibrous material within the journal box 10 from clogging inlet aperture 16. Under normal conditions or while the wheel hub is at its limit of movement away from the journal box, the spring 19 forces plunger 17 outwardly to its limit of movement through the bearing 14 and when so positioned, the outer ends of the radial ports 21 are closed owing to the fact that said ports are located beyond the inner face of bearing 14. (See Fig. 1.)

When the wheel moves inwardly or toward the journal bearing, the plunger 17 is forced inwardly against the resistance offerd by spring 19 to the position as illustrated in Fig. 2, thereby uncovering the ports 21. When so positioned, liquid lubricant is free to flow through said ports and through duct 20 and said liquid lubricant will discharge from the outer end of said duct directly onto the inner surface of the hub 12, such action being accelerated by the wiping movement of the inner face of the hub across the end of the plunger.

In the construction illustrated in Figs. 1 to 4 inclusive, the wall surrounding pocket 13 is shown as being an integral part of the journal box 10 and while such construction is entirely practical, it may be desirable to construct the device as illustrated in Figs. 5 and 6, wherein a hollow cylindrical member 23 is detachably seated in the outer wall of the journal box and the outer end of said cylindrical member being closed by a removable plug 24, the latter being provided with an axially disposed bearing for the plunger 17. This latter construction is adapted for journal boxes which are now in use.

A lubricating device of my improved construction is comparatively simple, is entirely automatic in operation, and is very effective in applying liquid lubricant to the inner faces of locomotive wheel hubs or in moving a member which operates immediately adjacent to a fixed member or bearing.

It will be readily understood that minor changes in the size, form and construction of the various parts of my improved lubricating device can be made and substituted for those herein shown and described, without departing from the spirit of my invention, the scope of which is set forth in the appended claims.

I claim:

1. The combination with a journal box having a pocket which receives liquid lubricant from the chamber within the journal box, of a spring pressed member arranged for operation within said pocket and extending to the exterior of the journal box, and there being a lubricant duct formed through said member.

2. The combination with a journal box provided with a pocket which receives liquid lubricant from the chamber within the journal box, of a spring pressed plunger arranged for operation in one of the walls of the pocket, there being a lubricant duct formed in said member, and the outer portion of said member normally projecting beyond the outer face of the journal box for engagement with the inner face of a part of the wheel carried by the axle operating in said journal box.

3. The combination with a journal box provided with a pocket adapted to receive liquid lubricant from the chamber within said journal box, a plug closing the outer end of said pocket, and a spring pressed plunger arranged for sliding movement in said plug, which plunger is provided with a liquid lubricant duct.

4. The combination with a journal box having a pocket adapted to receive liquid lubricant from the chamber within the journal box, of a plunger arranged for sliding movement through one of the walls of said pocket and extending to the exterior of the journal box, said plunger being provided with a lubricant duct, means for limiting the outward movement of said plunger, and yielding pressure means for resisting the inward movement of said plunger.

5. The combination with a journal box having a pocket adapted to receive liquid lubricant, of a removable member closing the outer end of said pocket, a plunger arranged for sliding movement through said removable member, the outer end of which plunger is adapted to be engaged by a movable member operating adjacent to the journal box, said plunger being provided with a lubricant duct, and yielding pressure means for resisting the inward movement of said plunger.

6. A journal box having a lubricant pocket and a perforated plunger arranged for operation within said pocket, a portion of which plunger extends to the exterior of the journal box and is adapted to be engaged and reciprocated by a member located adjacent to said box.

In testimony whereof I hereunto affix my signature this 31st day of October, 1919.

JAMES J. HENNESSY.